(12) United States Patent
Edwards et al.

(10) Patent No.: US 6,320,848 B1
(45) Date of Patent: Nov. 20, 2001

(54) METHODS OF ALTERING DYNAMIC DECISION TREES

(75) Inventors: Aled Justin Edwards, South Gloucestershire (GB); Costas Calamvokis, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/302,871

(22) Filed: Apr. 30, 1999

(30) Foreign Application Priority Data

May 1, 1998 (EP) .................................................. 98303425

(51) Int. Cl.[7] .................................................. H04L 12/56
(52) U.S. Cl. .................................................. 370/255; 370/401
(58) Field of Search .................................................. 370/255, 256, 370/389, 395, 401, 392; 709/239, 242, 252

(56) References Cited

U.S. PATENT DOCUMENTS

| 4,499,596 | * | 2/1985 | Casey et al. ............................ 382/37 |
| 5,509,006 | * | 4/1996 | Wilford et al. ....................... 370/401 |
| 5,574,910 | | 11/1996 | Bialkowski . | |
| 5,666,481 | | 9/1997 | Lewis . | |
| 6,018,524 | * | 1/2000 | Turner et al. ........................ 370/392 |
| 6,192,051 | * | 2/2001 | Lipman et al. ....................... 370/389 |

FOREIGN PATENT DOCUMENTS

WO 94/15305  7/1994  (WO) .

* cited by examiner

*Primary Examiner*—Douglas Olms
*Assistant Examiner*—Ken Vanderpuye

(57) ABSTRACT

A data packet switch includes a decision tree for classifying data packets, which can be dynamically modified. To conserve memory resources nodes which are found during modification to have matching effects are combined. If only a subset of paths to a node are relevant to a modification, the node is split. Prior to implementation of the modifications, temporary nodes are inserted before modified nodes to preserve existing paths. These temporary nodes are controlled by a single memory value which can be changed to effect all the modifications to the decision tree simultaneously.

7 Claims, 7 Drawing Sheets

METHODS OF ALTERING DYNAMIC DECISION TREES

TECHNICAL FIELD

This invention relates to methods of altering dynamic decision trees, for example for use in switches (e.g. hubs and routers) used for directing data packets in packet-based data communication networks, or in monitoring probes for collecting data about operation of such networks.

BACKGROUND ART

Large, high-capacity data communication networks, such as the Internet, are typically based on packet-switched techniques. In such techniques data to be communicated are divided into blocks each of which is combined with a header to form a data packet. The header includes, for example, information identifying the particular communications transaction to which the packet relates, and routing information identifying the sender and intended recipient of the data. Each packet is transmitted through the network between packet switching devices, such as hubs and routers, which examine the packet's header and use the routing information, in conjunction with data about the current operating status of the network, to choose a transmission path along which to route the packet towards its final destination.

As the demand for new and better quality data transmission increases, so does the need for faster yet more flexible packet switching devices. One technique used within packet switches for examining packet headers and making routing decisions relies upon the use of data structures often referred to as decision trees (though more formally described as directed acyclic graphs). Current implementations of decision trees suffer from various disadvantages. For example, typically a complete tree is developed in a single operation from a set of rules defining how packets are to be routed; thus even a single, trivial change to the rules involves generation of a complete new tree. If this tree is to replace an existing tree in a packet switch, the switch must be temporarily disabled (or at the very least incoming packets must be buffered) while the tree substitution takes place, in order to avoid the substitution affecting a packet for which routing decisions using the tree are already in progress. This both reduces the throughput of the packet switch, and increases its complexity and cost. Alternatively, two copies of the entire decision tree may be maintained, an active one for routing packets, and an inactive one which may safely be modified; when the modifications are complete, the active tree is made inactive and vice versa. Although such "double-buffering" avoids reducing the throughput of the switch, it involves expensive duplication of high-speed memory typically used to store decision trees.

It would be highly desirable to have a decision tree system which permitted incremental changes to be made to the decision tree in response to changes in the associated routing rules. It is also desirable that such changes be made without interrupting operation of the packet switch more than momentarily, and without any need to buffer incoming packets. It is an object of this invention to provide a method which facilitates the use of decision trees.

DISCLOSURE OF INVENTION

According to one aspect of this invention there is provided a method of altering a dynamic decision tree containing nodes from a first node configuration to a second node configuration, comprising the steps of:

(a) identifying a location in the decision tree at which at least one new node is to be inserted;

(b) inserting at that point a temporary node which has first and second states, the first state keeping the existing configuration of the tree unchanged, and the temporary node initially being in said first state;

(c) inserting said new node to depend from said temporary node and being coupled into said tree only when said temporary node is in said second state, (d) repeating steps (a), (b) and (c) for any additional new nodes to be inserted; and (e) simultaneously altering every temporary node from its first to its second state.

BRIEF DESCRIPTION OF DRAWINGS

A method of altering dynamic decision trees in accordance with this invention in a data packet switch will now be described, by way of example, with reference to the accompanying drawings, in which.

BEST MODE FOR CARRYING OUT THE INVENTION, & INDUSTRIAL APPLICABILITY

Figure 1:
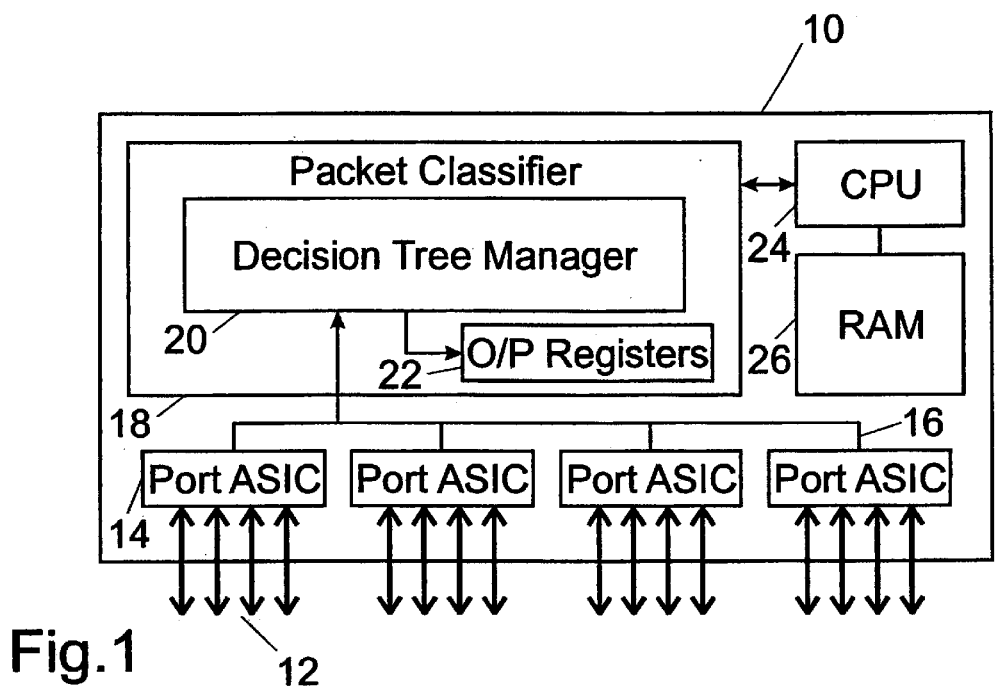
FIG. 1 is a block schematic drawing of a data packet switch.

Referring to FIG. 1, a packet switch 10 has several interfaces 12 for connecting the switch to physical network media (such as twisted pair cable, coaxial cable or optical fibre) carrying data packets in accordance with relevant standard protocols (such as 100Base-T Fast Ethernet, 100VG-AnyLAN, or FDDI). Each interface has an associated Port ASIC (application specific integrated circuit) 14 for controlling the flow of packets in and out of the interface according to known principles.

The Port ASICs 14 are coupled by a bus 16 to one another and to a packet classifier 18 which 'classifies' packets in accordance with information contained in their headers, and routes them accordingly from the interface where they were received to one or more other interfaces for onward transmission. To this end, the packet classifier 18 incorporates a decision tree manager 20 which contains memory for storing a decision tree and circuitry for using it to determine from packet header information how packets are to be routed. The results of this determination are temporarily stored in output registers 22 in the packet classifier 18, and the contents of these registers 22 are in turn supplied to the Port ASICs 14 via the bus 16 to control the actions of the Port ASICs 14 and thereby cause the packets to be routed as required. The packet classifier 18 is connected to a processor or CPU 24 which executes supervisory software program instructions to control overall operation of the packet switch 10, and in particular to control operation of the decision tree manager 20 to create and modify its decision trees. The CPU has an associated random access memory (RAM) 26 which stores these supervisory program instructions and also certain items of data (described below) relating to the structure and management of the decision trees.

The decision trees to be described herein are, in more formal terms, properly described as directed acyclic graphs. Nonetheless the term 'decision tree' has become widely adopted in this art to refer to such graphs and will therefore be used herein.

Figure 2:
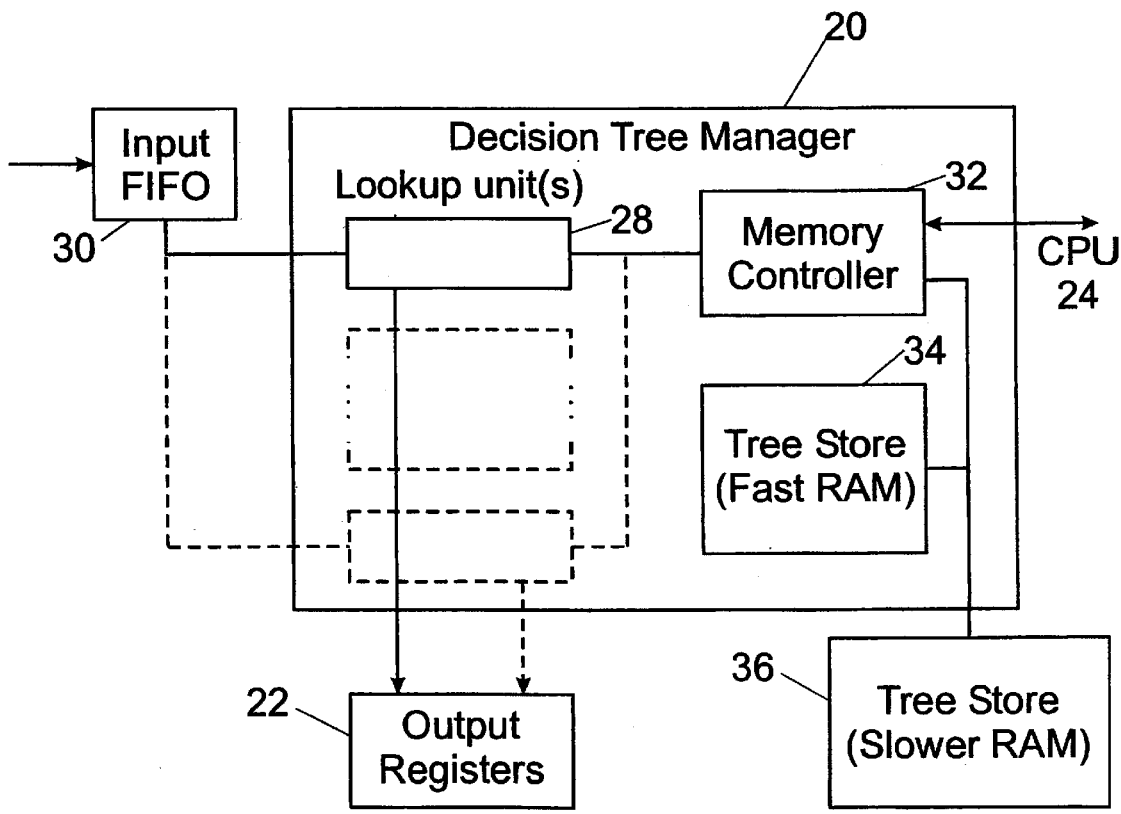
FIG. 2 is a block schematic drawing of a decision tree manager incorporated in the packet switch of FIG. 1.

Referring to FIG. 2, the decision tree manager 20 contains one or more lookup units 28 which receive packets from the bus 16 via a first-in first-out (FIFO) unit 30. These lookup units read instructions from the decision tree, implement the instruction (for example by reading further parts of the incoming packet from the FIFO 30, comparing those parts with test values, and/or setting the output registers 22), and then branch to another instruction in the decision tree. The lookup units 28 access the decision tree via a memory controller 32 which is coupled to the CPU 24 and to a tree store comprising two parts: a fast RAM store 34 integrated with the decision tree manager 20, and a slower RAM store 36 in a separate unit coupled to the decision tree manager 20.

There are various types of instruction in the decision tree:

Branch is the main instruction type. This can read a variable number of bits from the incoming packet (or from other sources) and uses the value that it has read to index or hash into an attached table to find a further instruction. Branches can also read values from one of a small set of registers, or from the the result produced by another lookup unit.

Action instructions allow the final outcome of the inbound packet to be decided. They modify certain ones of the output registers 22 which determine whether the packet should be forwarded, and if so, where.

Other instructions which allow bits to be discarded from the packet, registers to be assigned and moved, and counters in the decision tree to be incremented.

Instructions in the decision tree stored in the tree store 34/36 are defined by rules stored in the RAM 26 (FIG. 1) and processed by the CPU 24 to create and modify the decision tree. A rule has two main parts: a set of conditions (such as "If InPort==1"), and a set of actions (such as "then Drop-Packet" or "then output packet via PortASIC X").

If a packet matches the conditions (as embodied in the part of the decision tree corresponding to that rule), the related actions are performed. The conditions in a rule compare the value of a field with a fixed value (for example, a particular destination address for packets) in order to decide whether the actions should be performed; a field is typically a portion of the header of a packet of incoming data. Rules are contained within rulesets, which typically contain related sets of rules (that refer to the same set of fields). Adding a rule to a ruleset in the RAM 26 causes the CPU 24 to effect corresponding changes to the decision tree in the tree store 34/36, under the control of the supervisory software program stored in the RAM 26.

The supervisory software program maintains for each ruleset a 'rule tree' in the RAM 26, consisting of a set of interconnected nodes. Each rule can be considered as describing a notional path through this rule tree. Each node in the rule tree typically corresponds to one or more instructions in the decision tree in the tree store 34/36. When a packet matching a particular rule is being classified the packet classifier 18 executes instructions which correspond to the nodes on the rule's notional path through the rule tree. The nodes in the rule tree also store various items of information which are required to manage changes to the decision tree in the tree store 34/36.

The procedure for adding rules to a ruleset in the RAM 26 is illustrated in. FIGS. 3a to 3g, using as a first example a rule which contains a condition relating to the input port at which a packet is received (as recorded in a field InPort which is included in the packet header by the relevant PortASIC):

if InPort==1 or 2 then do ActionA, do ActionB          (rule 1)

Figure 3A:
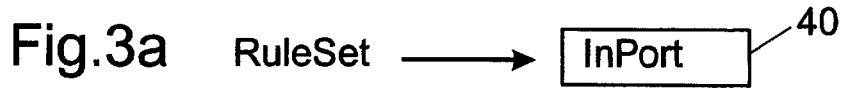
FIGS. 3a to 3g show a simple decision tree and steps involved in modifying it.

Referring to FIG. 3a, a 'branch' node 40 (corresponding to a branch instruction in the decision tree) is created containing information about the field InPort in the packet header. Creation of a node in practice involves steps (coordinated by the supervisory program in the RAM 26) such as assigning space in the RAM 26 for storing information about the node, and updating tables also stored in the RAM 26 for managing and retrieving such information, e.g. in accordance with the identity of a field referenced by a rule.

Figure 3B:
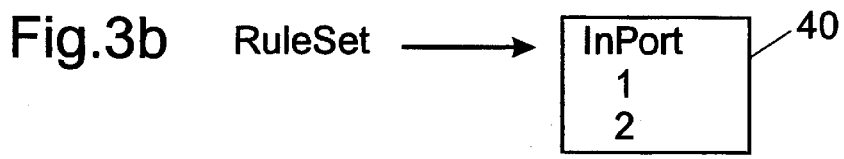

Next the branch node 40 is extended to contain entries for the specified test values, 1 and 2 (FIG. 3b). If there were further test conditions, corresponding nodes would be found or created, as necessary.

Figure 3C:
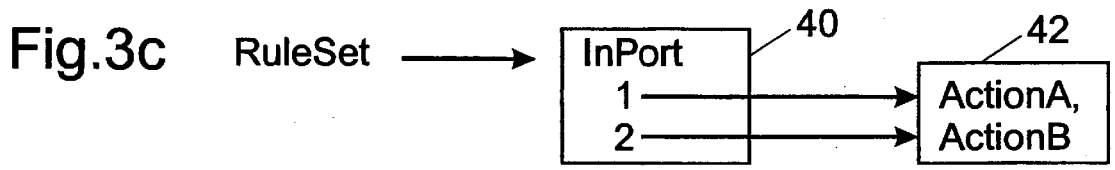

When nodes for all the rule's test conditions exist with relevant test values, an 'action' node 42 is added to contain the action(s) specified by the rule, as shown in FIG. 3c; in this case these are the actions ActionA and ActionB, which are both required for either of the values tested in the branch node 40. The new rule is now complete, and the CPU can be triggered to execute appropriate parts of the supervisory program to make corresponding changes, as described below, to the decision tree in the tree store 34/36 to cause the new rule actually to be implemented.

Subsequently it may be desired to add another rule, as follows:

if InPort==3 then do ActionA, do ActionB          (rule 2)

Figure 3D:
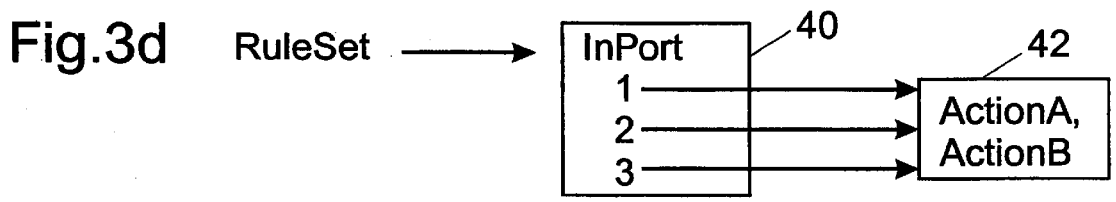

In this case a node which affects both ActionA and ActionB (the action node 42) already exists, as does a node (the branch node 40) which tests the value of the field InPort. Accordingly the supervisory program reuses the nodes 40 and 42, with additional entries, to incorporate the additional rule. The resulting rule tree is shown in FIG. 3d. Again, the supervisory program then makes the corresponding changes to the decision tree in the 15 tree store 34/36.

A third new rule may now be desired, as follows:

if InPort==3 then do ActionC          (rule 3)

Figure 3E:
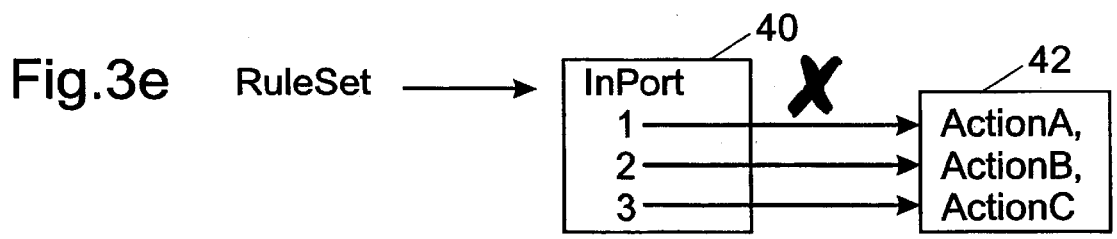
Figure 3F:
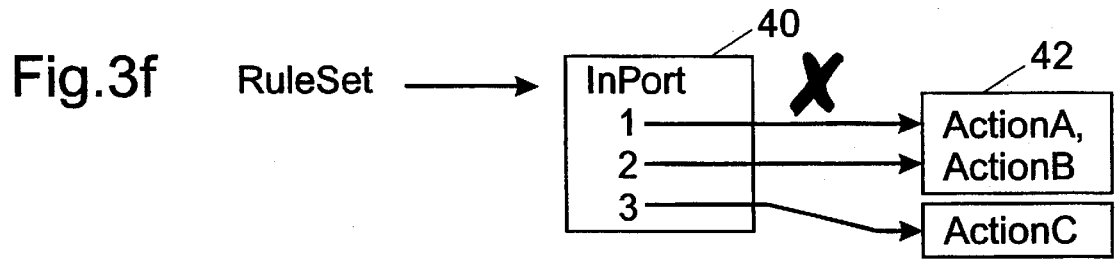

This rule must be added without affecting execution of the two rules previously added, which, in the case of rule 2, already require ActionA and ActionB when InPort is 3; equally, the effect of this new rule is limited to the case InPort==3, so the new ActionC must not be done when InPort is 1 or 2. Thus simply adding ActionC to the action node 42, as shown in FIG. 3e, is incorrect, as ActionA and ActionB should not be implemented when InPort is 3; likewise separating out ActionC for implementation when InPort is 3, as shown in FIG. 3f, is also wrong, because then ActionA and ActionB are incorrectly omitted for this value of InPort.

Figure 3G:
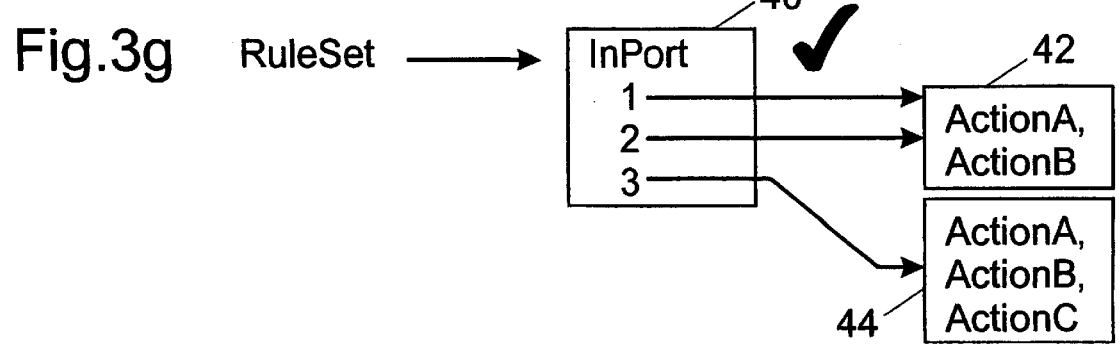

Accordingly, to add rule 3 correctly, the existing action node 42 must be copied to produce a second action node 44, as shown in FIG. 3g, with the actions for InPort values 1 and 2 in the original node 42, and the actions for InPort value 3 in the copy (node 44). Then the new ActionC can be correctly added to the new action node 44 only.

The rule addition process outlined above consists of three phases: phase 1 uses a recursive procedure (shown in FIG.

4) to traverse the rule tree in the RAM 26, matching conditions in the rule, creating or splitting nodes as necessary, and eventually storing the actions in the rule in the appropriate nodes; because this first phase is performed in the rule tree in the RAM 26, it has no effect on the functioning of the decision tree manager 20 as classification of packets continues; phase 2 inserts 'switch nodes' in the rule tree so that all the new and modified nodes are isolated from the old tree structure, and detects and combines any duplicate nodes; phase 3 generates new instructions in the tree store 34/36 corresponding to the new/modified nodes in the RAM 26, and generates special 'switch' branch instructions corresponding to the switch nodes; because the new instructions are isolated by the switch instructions, the decision tree in the tree store 34/36 still functions exactly as before; all the switch instructions reference a single control value at a specified location in the tree store 34/36 (for example by invoking an instruction which examines and returns the value in that location); this control value initially contains a value of 0, causing the switch instructions to point to the old paths; then in a single operation a value of 1 is written into the control location; at that moment, all the switch instructions simultaneously switch over to the new path, and thereafter all packet classification operations follow the new, modified decision tree. (If more than one change is required along a single path through the rule tree for the classification of a packet, classification is briefly disabled and the switch over is performed only when no packets remain in the classification process.) Thereafter the switch nodes and instructions and redundant old nodes and instructions are removed. Many new rules can be added in phases 1 and 2 before phase 3 is invoked.

Phase 1

Figure 4:
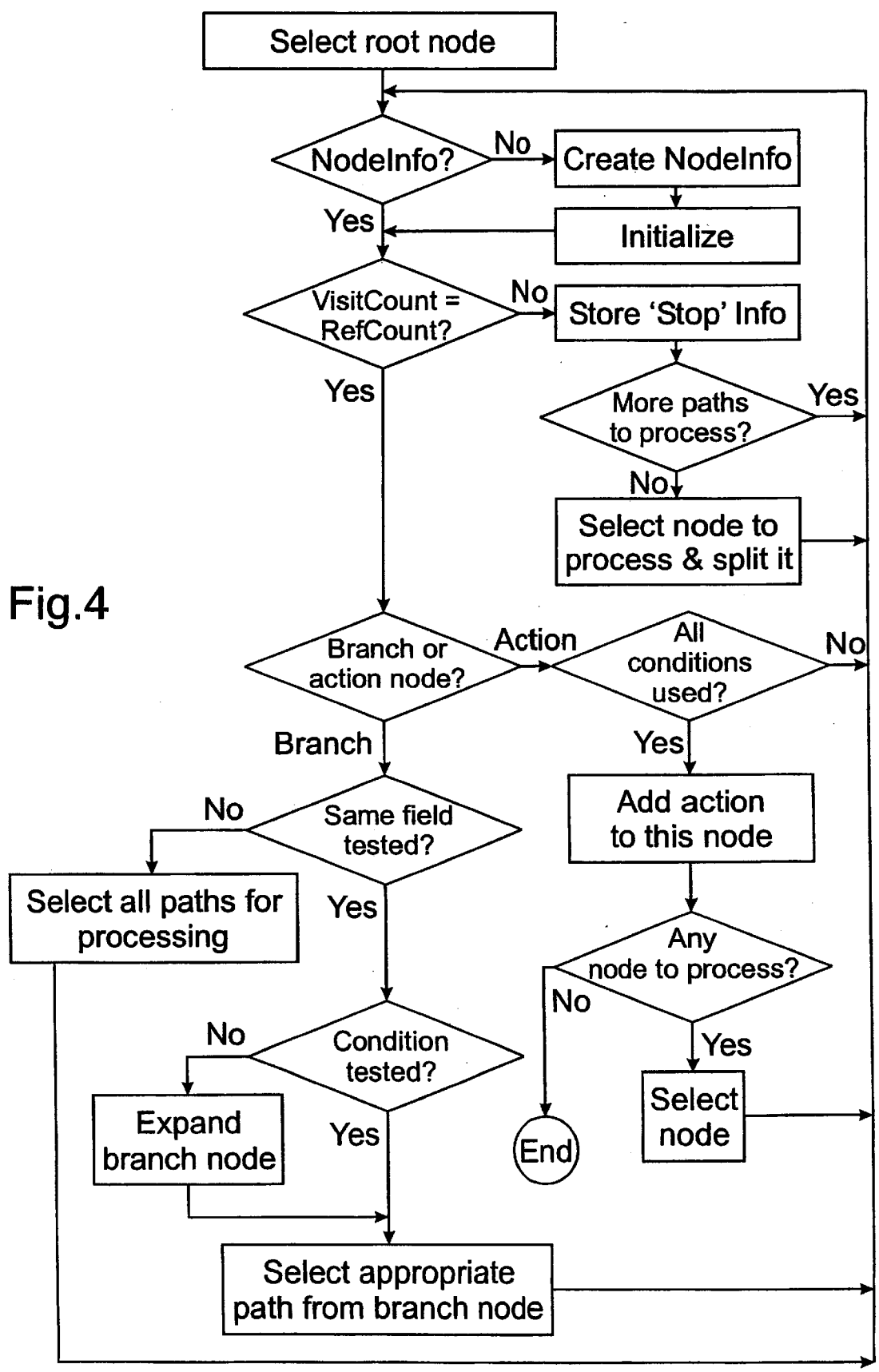
FIG. 4 is a flowchart illustrating the principal steps in a recursive procedure for managing changes to a dynamic decision tree.

Before the recursive procedure of FIG. 4 starts, a NodeInfo array is initialized. This array keeps track of each node as it is encountered, by maintaining the following data for it:

VisitCount—how often the node has been visited during recursion;

RefCount—how many other nodes point to it (this information is also held in association with each node individually in the RAM 26);

backpointers to the entries in the nodes which contain pointers to this node. NodeInfo array entries are maintained in a doubly-linked list sorted by depth in the tree.

The recursive procedure starts at the root node of the rule tree (i.e. the branch node which examines the first field in the packet for which a rule condition was ever specified in the ruleset), and performs the following cycle:

(1) look up a NodeInfo array entry for the current node; if there is no such entry, create one.

(2) Examine the values of VisitCount and RefCount in that NodeInfo entry:

if they are not equal, stop the recursive procedure (see below);

if they are equal the rule can simply be added to the current node (see below).

The recursive procedure is stopped when the values of VisitCount and RefCount are not equal, because this means that the procedure has not examined all paths to the current node. In this case, the procedure must back up the rule tree examining nodes from which it reached the node at which the stop occurred. If it finds a path from such a node which has not yet been examined, the recursion resumes along that path. If no such unexamined path is found, the procedure seeks a node, nearest to the root node, at which recursion had previously stopped, and resumes recursion from there. This process continues until every node for which recursion had stopped has been resolved, either because following another path to the node causes VisitCount and RefCount to become equal, or if necessary by splitting the node.

The process for adding a rule to a node, once the appropriate node has been identified as described above, depends on whether the node is a branch node, a switch node or an action node.

If it is a branch node, it may not test the field contained in the rule's condition, in which case all of the paths from the node are acceptable. Accordingly each of these paths is selected one after the other, and the recursive procedure is applied to the selected path. If the field referenced in the rule's condition is tested in the branch node there are two situations to consider:

the condition in the rule may restrict the acceptable paths out of the node to a subset of all the paths from that node; in this case the recursive procedure resumes on the first path in that subset;

the value(s) tested by the rule's condition may not currently be specified in the branch node, in which case the branch node is expanded to include the additional value(s) (as in the extension from FIG. 3c to FIG. 3d described above)—this might require the node to be copied, if the resources in the RAM 26 for that node are already fully occupied; the recursive procedure then resumes from the first path associated with the newly-added test value(s).

A switch node is treated similarly to a branch node, except that only the "new" path which caused that switch node to be added is selected for examination by the recursive procedure.

If the node to which the rule is to be added is an action node, and all the conditions tested by the rule have been implemented, the actions in the rule are simply added to the action node, and the recursive procedure has been completed. If there are conditions yet to be implemented, the recursive procedure continues straight through the action node.

When all nodes at which recursion stopped have been resolved, and all the actions in the rule being added have been placed in action nodes, the recursive procedure of Phase 1 is complete. However, the new or modified nodes are not yet linked into the rest of the rule tree.

Phase 2

For each chain of one or more new or modified nodes a switch node is inserted into the rule tree. To this end the rule addition process traverses back up the rule tree, using the backpointers, identifying the nodes to which new nodes should be connected by a path. The connection is established via a switch node which is also inserted, so that the new nodes (when reproduced as instructions in the tree store 34/36) are temporarily prevented from having any effect.

During this phase the rule addition process also detects any node which exactly matches the effect of another node, and combines them into a single, shared node, with a view to keeping the size of the tree minimal. To this end, the process compares nodes which are likely candidates for combination. A node matches the effect of another node if:

both are action nodes containing the same actions; or both are branch nodes, testing the same field against the same set of values.

If two nodes match in this manner, the newly-added node is removed by modifying any branch node which points to the new node so that it points to the matching existing node instead. This procedure is continued recursively back along any chain of nodes containing the new duplicate node.

Phase 3

For all new or modified nodes in the RAM 26:

memory is allocated in the tree store 34/36;

each new or modified node is transformed into the corresponding set of instructions in the tree store;

branch nodes become branch instructions;

action nodes become action instructions;

switch nodes become switch instructions (special branch instructions);

all the existing instructions are modified to point to the switch instructions;

existing nodes which have been modified to point to switch nodes are located, and the corresponding instructions in the tree store 34/36 are modified to point to the relevant switch instructions;

the memory control location controlling the state of the switch instructions is changed in value from 0 to 1, thereby causing all the switch instructions simultaneously to change state to point along the new paths;

the existing instructions pointing to switch instructions are modified to point directly along the new paths rather than via the switch instructions in their changed state;

any redundant old nodes and instructions and the switch nodes and instructions are removed (i.e. the memory locations containing information about them and their links to other nodes are cleared and those locations are returned to a pool of free memory for re-use).

Example of rule addition

FIGS. 5 to 12 show a practical example of addition of a rule in accordance with the procedure described above.

Figure 5:
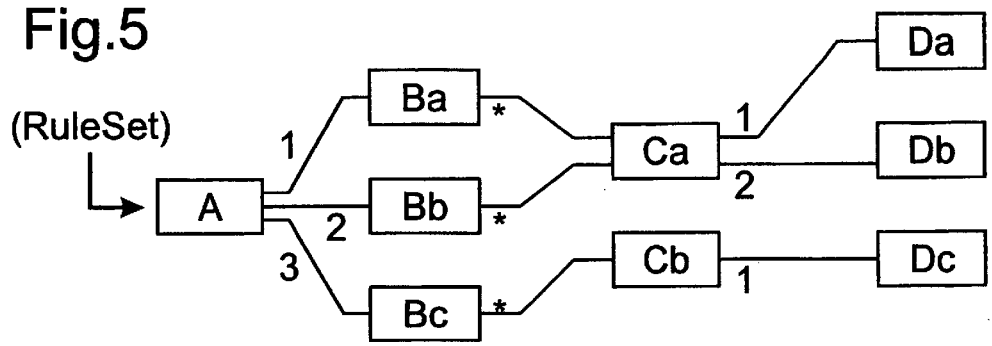
FIGS. 5 to 14 show steps involved in managing changes to a dynamic decision tree.

Referring to FIG. 5, a ruleset already exists for the rules including conditions as follows:

if (A==1 or 2) and (B==*) and (C==1) and (D==...) then ...
      (rule 4)

if (A==1 or 2) and(B==*) and (C==2) and (D==...) then ...
      (rule 5)

if (A==3) and (B==*) and (C==1) and (D==...) then ... (rule 6)

It is noted that the value of B is immaterial in this example (although later rules might specify conditions on this value); the node Ca is shared, to keep the decision tree compact. The new rule to be added is:

if (A==1 or 3) and (B==*) and (C==2) then do ActionX    (rule 7)

The recursive procedure of Phase 1 starts at the root node of the rule tree in the RAM 26, i.e. the branch node A. Upon checking the NodeInfo array for an entry for this node, the procedure finds there is none as this is the first time the node has been examined during processing of this new rule 7, so:

a NodeInfo array entry is created;

its VisitCount parameter is incremented to a value of one;

its RefCount parameter is set to the value stored in association with the node A itself;

a backpointer to the ruleset itself is added to the entry.

Next the value of the RefCount parameter in this NodeInfo entry (1 in this case, because node A is referenced by only one 'node', the ruleset itself) is compared with the VisitCount parameter (now also 1). They are equal, so the recursive procedure can continue with adding rule 7 in respect of this node. Because it is a branch node, the procedure must next examine whether this node tests a field referenced in the rule 7; node A tests field A, which is indeed also tested in rule 7, so now the procedure selects a path to follow from node A. There are two relevant paths, for the values A==1 and A==3; the procedure first selects the path for A==1 and recurses to examine the next node along that path, namely node Ba.

Upon checking the NodeInfo array for an entry for this node Ba, the procedure finds there is none as this is the first time the node has been examined during processing of this new rule 7, so:

a NodeInfo array entry is created;

its VisitCount parameter is incremented to a value of one;

its RefCount parameter is set to the value stored in association with the node Ba itself;

a backpointer to the node A is added to the entry.

The value of the RefCount parameter in this NodeInfo entry (1 in this case, because node Ba is referenced by only one node) is compared with the VisitCount parameter (now also 1). They are equal, so the recursive procedure can continue with adding rule 7 in respect of this node. Because it is a branch node, the procedure must next examine whether this node tests a field referenced in the rule 7; node Ba tests field B, which is indeed also tested in rule 7, but with a "don't care" (wildcard) value, so the procedure selects all paths to follow from node Ba—there is only one path in this case, to node Ca.

As for the first two nodes checked, the procedure finds there is no NodeInfo array entry for the node Ca, so:

a NodeInfo array entry is created;

its VisitCount parameter is incremented to a value of one;

its RefCount parameter is set to the value stored in association with the node Ca itself;

a backpointer to the node Ba is added to the entry.

The value of the RefCount parameter in this NodeInfo entry (2 in this case, because node Ca is referenced by two nodes: Ba and Bb) is compared with the VisitCount parameter (now 1). They are not equal, so the recursive procedure must stop at this point, and store how far the procedure had advanced on this path in the NodeInfo array entry for the node Ca. The procedure now returns to the node Ba, and establishes that processing for that node is complete, so it returns further to the node A, and establishes the processing for that node is still required, in respect of the path for the value A==3, towards the node Bc.

Accordingly the recursive procedure now checks the NodeInfo array for an entry for this node, and again finds there is none, so:

a NodeInfo array entry is created;

its VisitCount parameter is incremented to a value of one;

its RefCount parameter is set to the value stored in association with the node Bc itself;

a backpointer to the node A is added to the entry.

The value of the RefCount parameter in this NodeInfo entry (1, because the node Bc is referenced by only one node) is compared with the VisitCount parameter (now also 1). They are equal, so the recursive procedure can continue with adding rule 7 in respect of this node. It is a branch node, so the procedure next examines whether this node tests a field referenced in the rule 7; node Bc tests field B, which is indeed also tested in rule 7, but with a "don't care" (wildcard) value, so the procedure selects all paths to follow from node Bc—there is only one path, to node Cb.

As before the recursive procedure finds there is no entry in the NodeInfo array for this node, so:

a NodeInfo array entry is created;

its VisitCount parameter is incremented to a value of one;

its RefCount parameter is set to the value stored in association with the node Cb itself;

a backpointer to the node Bc is added to the entry.

Figure 6:
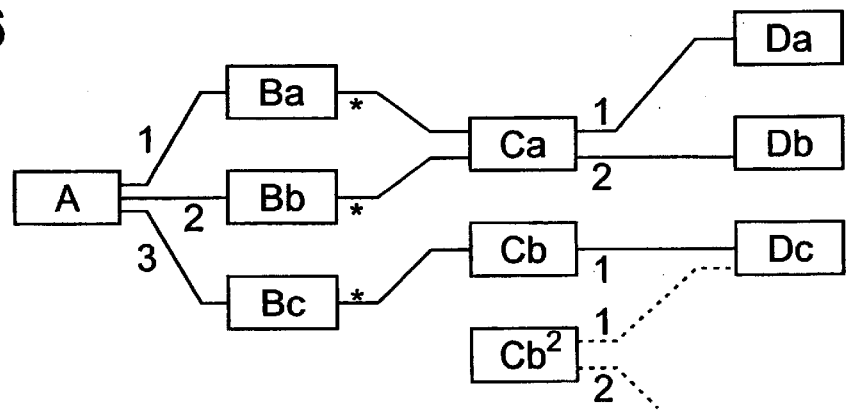
Figure 7:
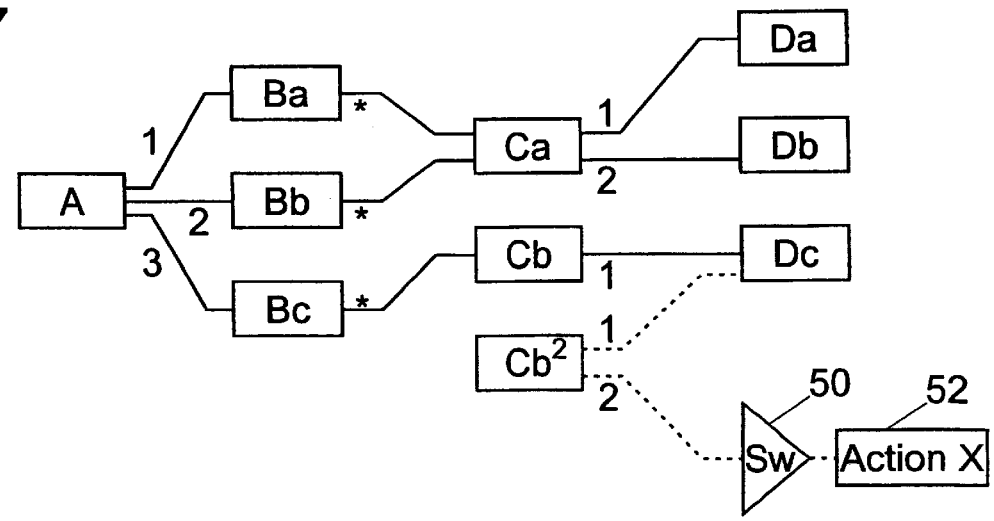
Figure 8:
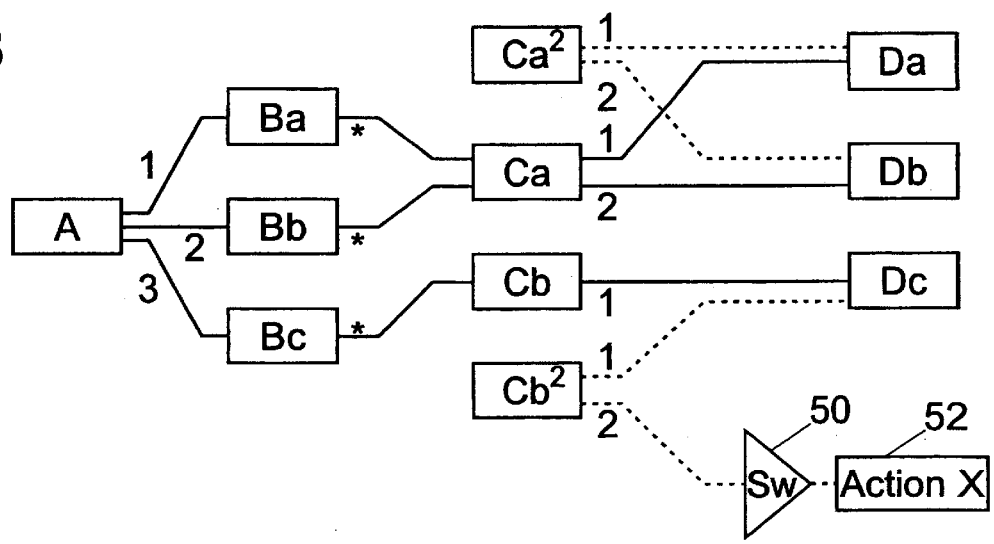

The value of the RefCount parameter in this NodeInfo entry (1, because the node Cb is referenced by only one node) is compared with the VisitCount parameter (now also 1). They are equal, so the recursive procedure can continue with adding rule 7 in respect of this node. It is a branch node, so the procedure next examines whether this node tests a field referenced in the rule 7; node Cb tests field C, which is tested in rule 7, so now the procedure attempts to select a path to follow from node Cb. However, there is no path from the node Cb for the value C==2, so one must be added. It will be assumed in this example that the existing node Cb cannot accommodate another test value, so a new node $Cb^2$ is needed (FIG. 6). This node $Cb^2$ is created with sufficient resources in the RAM 26 to contain a copy of the current contents of the existing node Cb (the test value C==1, leading to the node Dc), plus the new test value C==2.

At this point all the conditions in the new rule 7 have been accounted for, so the action it specifies (ActionX) can be added directly as the outcome of the new node $Cb^2$ for the case C==2. To this end, a switch node 50 (FIG. 7) is created in the RAM 26, with a link from the appropriate outcome of the node $Cb^2$, and leading to a new action node 52 specifying ActionX. At this point the node $Cb^2$ is inactive, because it has no input path, so both its outcomes are also inactive, as represented by dashed lines in FIG. 7. Although for this reason the switch node 50 is not strictly necessary, it is included as a precaution against failure to complete the addition of the new rule 7 on paths yet to be followed, in which case the new ActionX should not take effect anywhere. The switch node 50 ensures that this new action remains isolated until addition of the new rule has been completely successful.

The procedure replaces the NodeInfo array entry for the obsolete node Cb with a NodeInfo entry for the replacement node $Cb^2$, and then returns to examine the preceding node Bc. It finds that processing for that node is complete, so it returns further to the node A, for which processing is now also complete. Accordingly the recursive procedure checks whether there are any outstanding nodes for which recursion had to be stopped, and finds that this is the case for the node Ca. Therefore the recursion must be resumed at that node.

The procedure compares the RefCount value for this node Ca (2) with its VisitCount value (1), and finding that they differ and in the absence of any other possibility, it splits the node into two. Accordingly a new node $Ca^2$ is created (FIG. 8), duplicating the contents of the existing node Ca and also paths out of it to the nodes Da and Db. The new rule 7 specifies a condition for the field C (C==2), and the new node $Ca^2$ already includes a test for this value; furthermore all conditions in the new rule 7 have now been accounted for at this point, so an action node 54 for the action it specifies can be added on the (currently inactive) path out of node $Ca^2$ (towards the node Db)—see FIG. 9. Note that the creation of the new node $Ca^2$ ensures that the new rule 7 is correctly added, only for the cases where A has the values 1 and 3, but not in the case where A has the value 2.

At this point the recursive procedure establishes that all stopped recursions have been completed, and therefore Phase 1 of the addition of rule 7 has also been completed.

Figure 9:
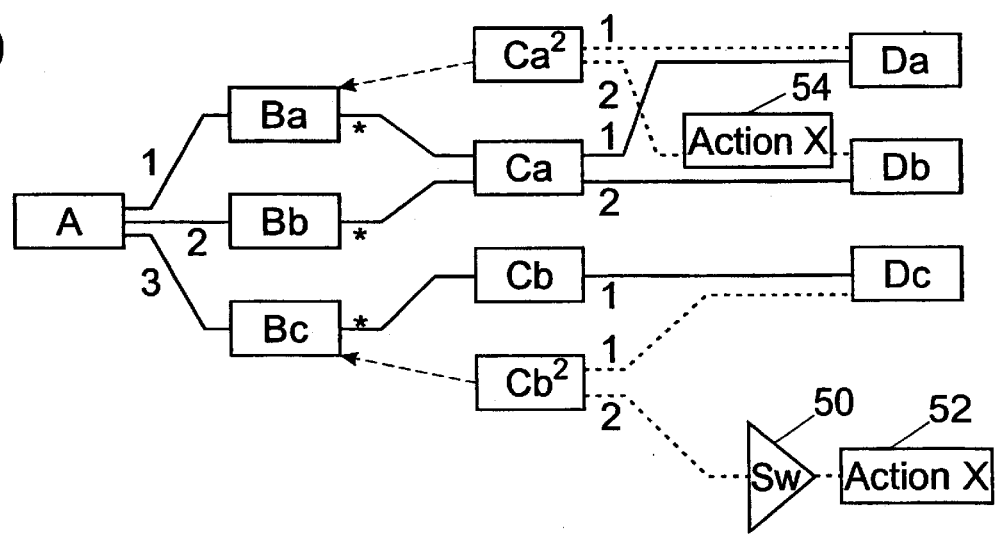
Figure 10:
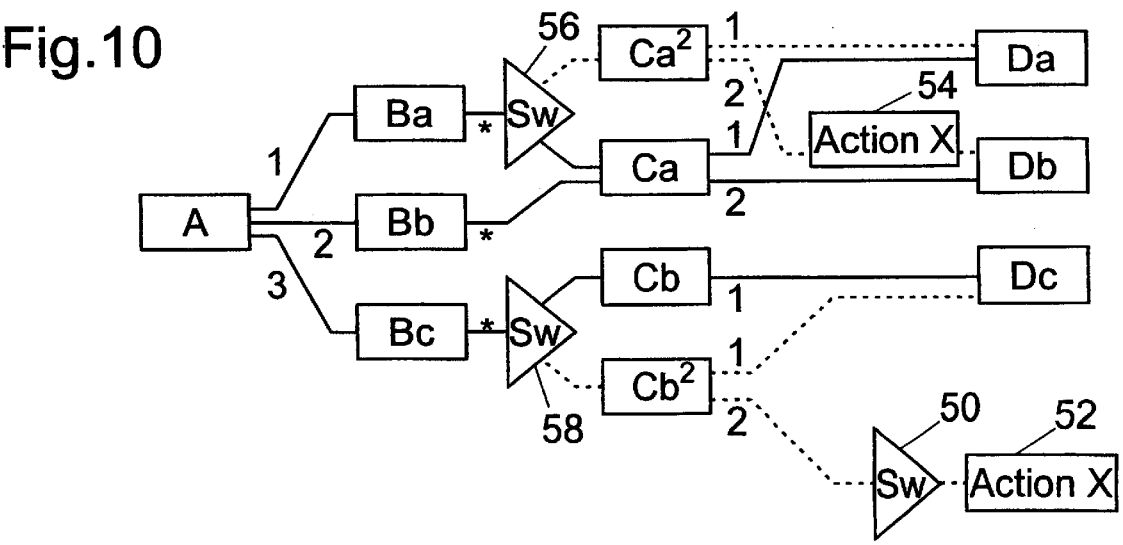
Figure 11:
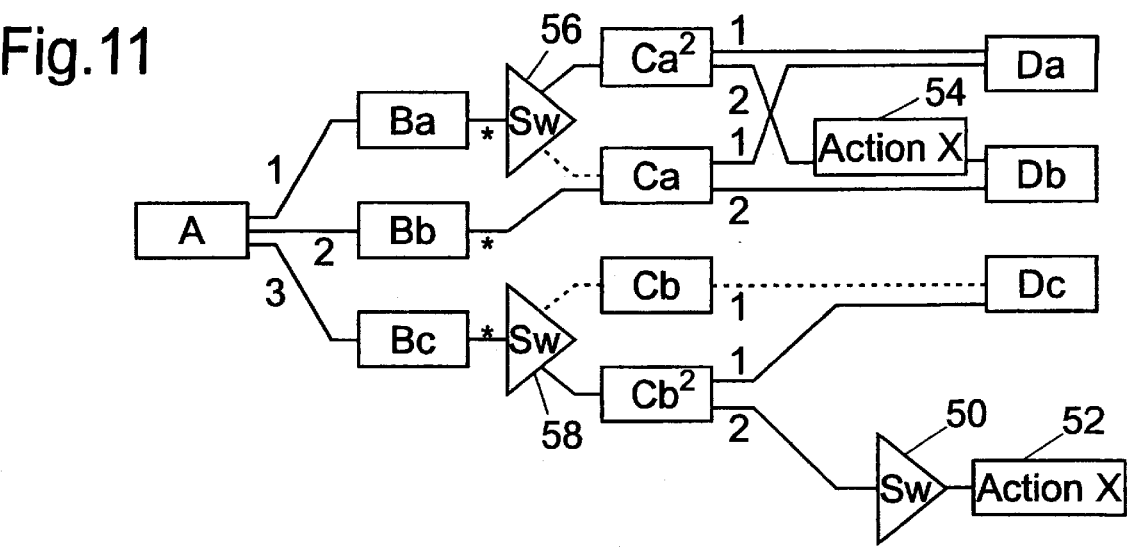

In Phase 2 the procedure identifies newly added nodes which need to linked to existing nodes through switch nodes, as indicated by dashed arrows in FIG. 9. To this end, the procedure examines the NodeInfo array entry for each newly-added node, seeking backpointers that indicate existing nodes from which such links should be made. For each such link a switch node is created. For example, the new node $Ca^2$ duplicates the existing node Ca, which is linked to the existing node Ba. Accordingly a switch node 56 is placed in the existing link between the existing nodes Ba and Ca, and is initially set to maintain the path along that link (FIG. 10). The alternative, currently unused, path from the new switch node 56 is coupled to the new node $Ca^2$. A new switch node 58 is similarly added in respect of the nodes Bc, Cb and $Cb^2$.

Next, in Phase 3, the new and modified nodes in the rule tree in the RAM 26 are transformed into instructions placed in the tree store 34/36, to produce a corresponding modified decision tree. Thus FIGS. 10 to 12, in particular, illustrate the structure of the decision tree in the tree store 34/36 as well as of the rule tree in the RAM 26.

For each new node $Ca^2$, $Cb^2$, 52 and 54 (ActionX) in the rule tree, corresponding instructions are created in the tree store 34/36 (i.e. memory resources in the tree store are assigned and pointers to the memory for other nodes are set up as appropriate). Likewise, switch instructions are created in the tree store 34/36, corresponding to the switch nodes 50, 56 and 58, and set by the 0 value in the control location to preserve the existing paths through the decision tree and keep the new instructions isolated. The existing instructions in the decision tree for the nodes Ba and Bc are modified so that the paths from them lead to the switch instructions corresponding to the switch nodes 56 and 58 respectively, instead of directly to the instructions corresponding to the nodes Ca and Cb.

The value in the control location is now changed from 0 to 1. The switch instructions corresponding to the switch nodes 50, 56 and 58 change state simultaneously so that the paths from them now lead to the new instructions for the nodes 52, $Ca^2$ and $Cb^2$ respectively. Thus the modified decision tree is implemented in a single, effectively instantaneous transition, without any intermediate state involving a mixture of the previous and modified trees.

Figure 12:
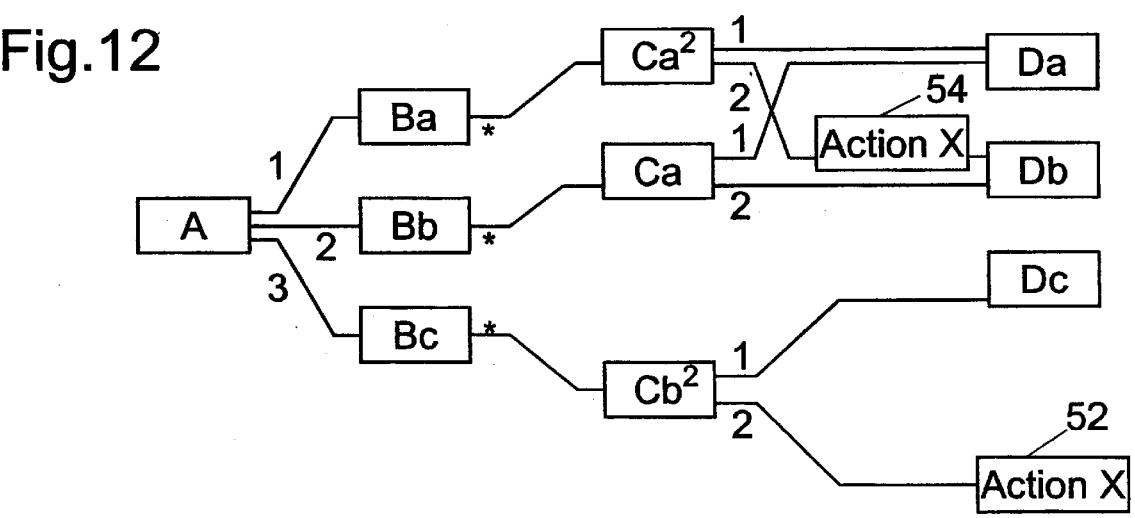

The instructions corresponding to the nodes Ba and Bc are modified again so that the paths from them lead directly to the new instructions for the nodes $Ca^2$ and $Ca^2$, instead of to the switch instructions corresponding to the switch nodes 56 and 58, and the instruction for the node $Cb^2$ is likewise modified to connect directly to the action instruction corresponding to the action node 52. Then the switch instructions for the switch nodes 50, 56 and 58 are removed (i.e. the memory resources storing information about them are cleared and released for re-use), as is the obsolete instruction corresponding to the obsolete node Cb (FIG. 12). The nodes themselves in the RAM 26 are likewise deleted.

As noted above, in Phase 2 the process detects duplicate nodes and combines them so that their functionality is shared, with a view to minimizing the use of memory resources. This may be illustrated by the example of adding a new rule 8, as follows:

if (A==3) and (B==*) and (C==3) then do ActionX     (rule 8)

Figure 13:
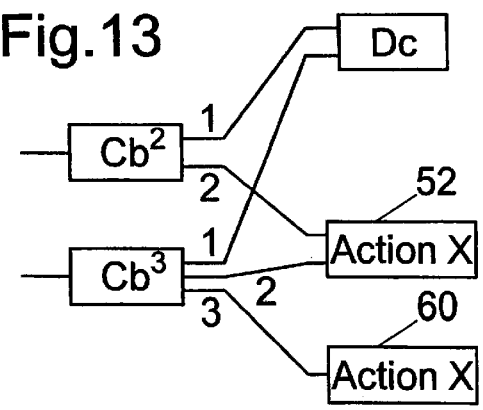
Figure 14:
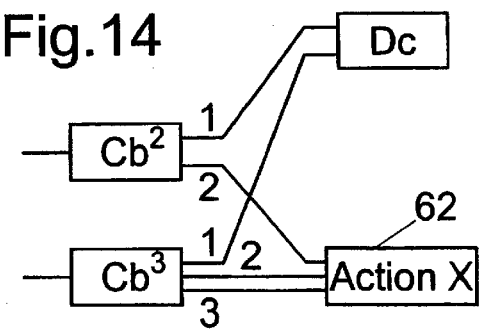
Figure 15:
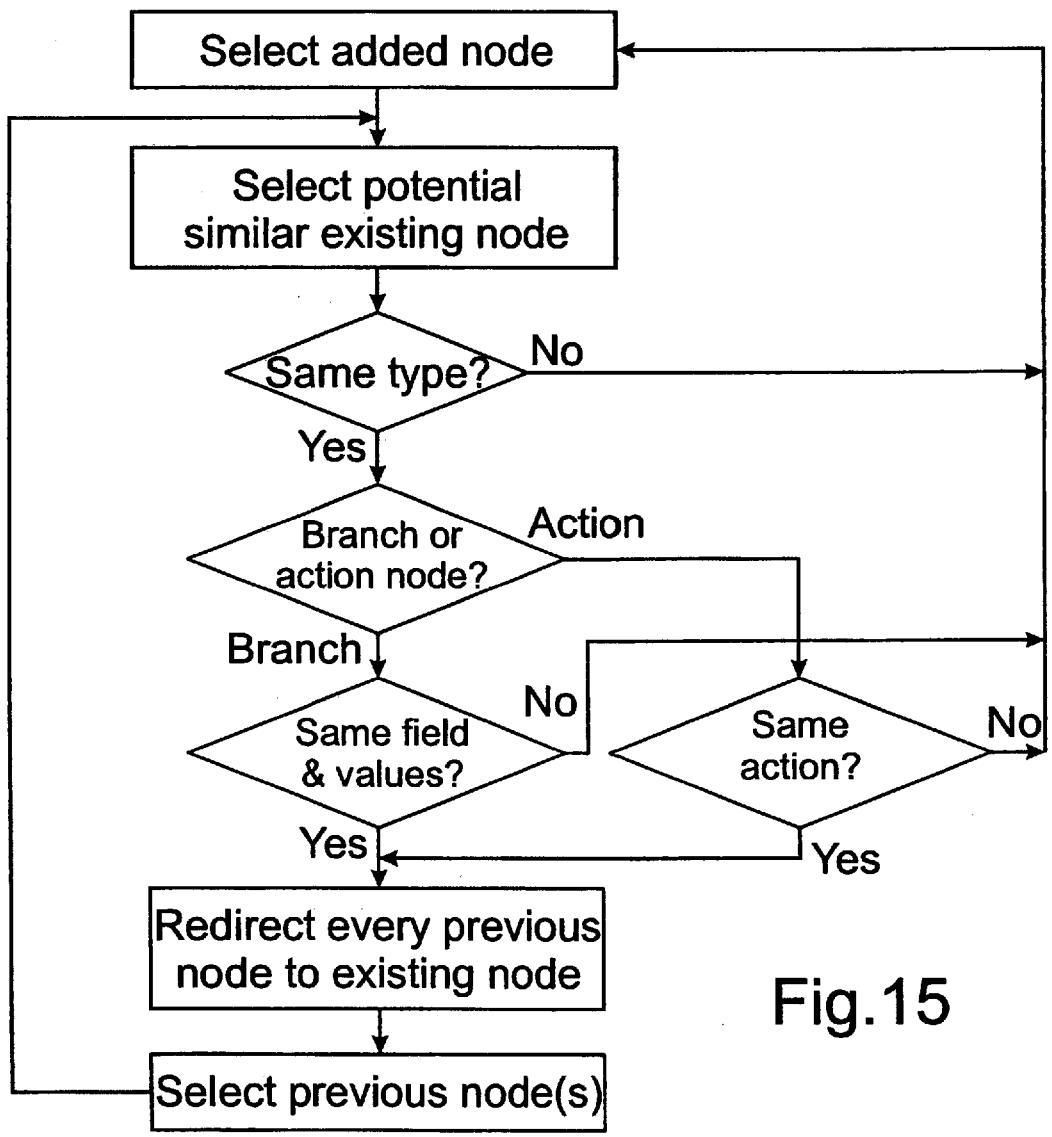
FIG. 15 shows a procedure for merging matching nodes.

Phase 1 generates a new node $Cb^3$, as shown in FIG. 13, with a path to the node Dc for the case where C has the value 1, and paths to action nodes 52 (existing) and 60 (new), each containing ActionX, for the cases where C has the value 2 or 3 respectively. In Phase 2 the process detects that the two action nodes 52 and 60 are identical, in accordance with the criteria described above, and combines them into a single action node 62 as shown in FIG. 14. A procedure for implementing combination of nodes in this manner is shown in FIG. 15.

The process for deleting rules is very similar to the process for adding rules, except the final step, where the rule actions are added to an action node, is replaced with a step where the rule actions are removed from the action node. In this case if the action(s) present in the rule to be deleted are not actually found in the action node, an error condition must be indicated.

Although the examples above have been described in the context of decision trees for packet switching, the invention is not limited to such use. It is also applicable, for example, to test probes connected to network communications links to collect protocol and timing information for remote display and analysis; in this case, the decision tree may be used to define the operation of a protocol so that the probe can compare actual implementation of the protocol by packets traversing the network with the theoretical definition of the protocol. Another possible use is in virus scanners for checking software programs; such scanners can operate by seeking any one of multiple particular sequences of instruction codes in program and data files. This process can conveniently be implemented in a decision tree. As new computer viruses are developed it is necessary to update virus scanners (and thus their decision trees) continually. The present invention provides a convenient method for accomplishing this.

What is claimed is:

1. A method of altering a dynamic decision tree containing nodes from a first node configuration to a second node configuration, comprising the steps of:

(a) identifying a location in the decision tree at which at least one new node is to be inserted;

(b) inserting at that point a temporary node which has first and second states, the first state keeping the existing configuration of the tree unchanged, and the temporary node initially being in said first state;

(c) inserting said new node to depend from said temporary node and being coupled into said tree only when said temporary node is in said second state;

(d) repeating steps (a), (b) and (c) for any additional new nodes to be inserted; and (e) simultaneously altering every temporary node from its first to its second state.

2. The method of claim 1, including the step of:

(f) removing every temporary node.

3. The method of claim 1, including the step of:

(g) removing any node contained in said first configuration which is redundant in said second configuration.

4. The method of claim 3, wherein a count is maintained in respect of the number of paths along which each node in the tree can be reached, and a node is considered to be redundant if its respective count is zero.

5. The method of claim 1, wherein the state of every temporary node is dependent upon a common control value, and the state of every temporary node is simultaneously altered by changing said common control value.

6. The method of claim 1, wherein the dynamic decision tree is part of a switch for switching data packets in a data communications network.

7. The method of claim 1, wherein the dynamic decision tree is part of a probe for passive monitoring of operation of a data communications network.

* * * * *